United States Patent [19]

Harris et al.

[11] Patent Number: 4,952,465

[45] Date of Patent: Aug. 28, 1990

[54] ADDITIVE FOR ENERGY STORAGE DEVICES THAT EVOLVE OXYGEN AND HYDROGEN

[75] Inventors: Jonathan H. Harris, Shaker Heights; Allan V. Marse, Independence; Michael A. Tenhover, Solon; Richard M. Wilson, Medina, all of Ohio

[73] Assignee: The Standard Oil Company, Cleveland, Ohio

[21] Appl. No.: 237,635

[22] Filed: Aug. 26, 1988

Related U.S. Application Data

[63] Continuation of Ser. No. 857,682, Apr. 30, 1986, abandoned.

[51] Int. Cl.$^5$ ............................................. H01M 10/52
[52] U.S. Cl. ........................................ 429/60; 420/900
[58] Field of Search ...................... 429/59, 60, 61, 248; 420/900

[56] References Cited

U.S. PATENT DOCUMENTS

| | | | |
|---|---|---|---|
| 2,934,580 | 0/1960 | Neuman | 136/6 |
| 3,117,033 | 0/1964 | Bachman | 136/6 |
| 4,275,127 | 6/1981 | Ritterman et al. | 429/57 |
| 4,327,157 | 4/1982 | Himy et al. | 429/248 |
| 4,350,745 | 9/1982 | Parsen et al. | 429/57 |
| 4,551,400 | 11/1985 | Sapru et al. | 420/900 |
| 4,605,603 | 8/1986 | Kanda et al. | 429/57 |
| 4,621,034 | 11/1986 | Kanda et al. | 429/59 |
| 4,623,597 | 11/1986 | Sapru et al. | 429/101 |
| 4,637,967 | 1/1987 | Kemm et al. | 429/101 |

FOREIGN PATENT DOCUMENTS

| | | |
|---|---|---|
| 0140693 | 5/1985 | European Pat. Off. . |
| 2452064 | 5/1976 | Fed. Rep. of Germany ........ 429/59 |
| 8429194 | of 0000 | Japan . |
| 8430806 | of 0000 | Japan . |
| 7313298 | 4/1973 | Japan ................................. 429/59 |
| 15139 | 2/1979 | Japan ................................. 429/59 |
| 4015140 | 3/1979 | Japan ................................. 429/59 |

OTHER PUBLICATIONS

Libowitz et al., "Interactions of Hydrogen with Metallic Glass Alloys", 101 J. Less-Common Metals, pp. 131–143, (1984).

Ivey et al., "Metal Hydrides for Energy Storage", 3 J. Materials for Energy Systems, pp. 3–19, (1981).

Schroeder et al., "Hydrogen Embrittlement of Metallic Glasses", 56 J. of Non-Crystalline Solids, pp. 213–218, (1983).

Primary Examiner—Donald L. Walton
Attorney, Agent, or Firm—Larry W. Evans; Joseph G. Curatolo; Sue E. Phillips

[57] ABSTRACT

Novel additives are disclosed comprising a material capable of absorbing hydrogen and recombining oxygen, which additive is ideally suited for incorporation in sealed cells. The additive may be disposed in an energy storage device in several manners such as a coating on a negative electrode, a thin layer disposed between cell separators, an auxilliary electrode, and as one negative electrode in a device having a plurality of negative and positive electrodes.

16 Claims, 2 Drawing Sheets

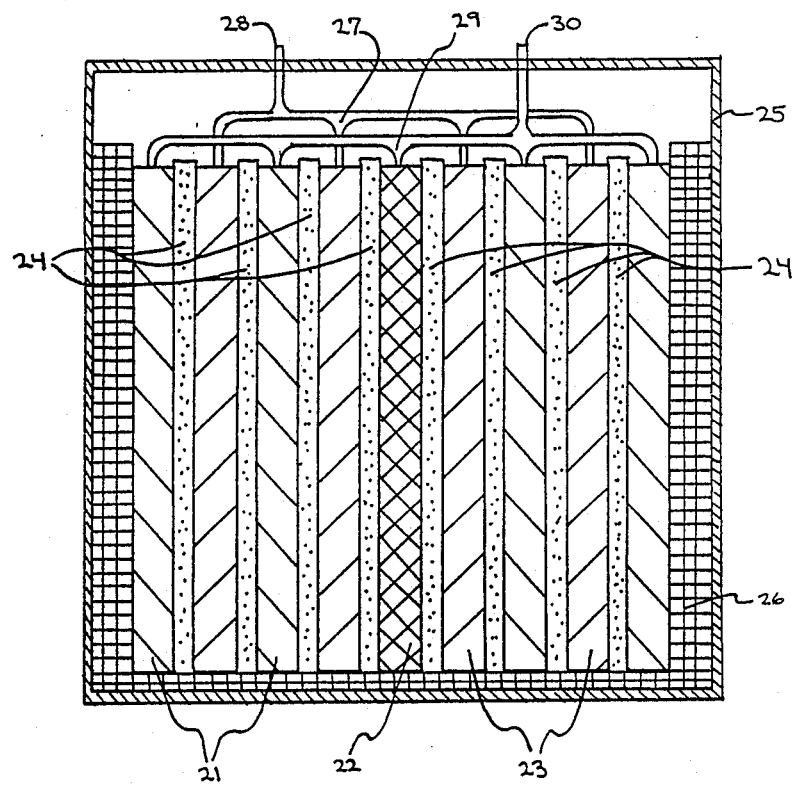

ADDITIVE FOR ENERGY STORAGE DEVICES THAT EVOLVE OXYGEN AND HYDROGEN

This is a continuation of co-pending application Ser. No. 857,682 filed on Apr. 30, 1986 now abandoned.

FIELD OF THE INVENTION

The present invention relates to novel electrode additives for use in electrochemical energy storage devices that evolve gaseous hydrogen and oxygen. More specifically, the present invention relates to an electrode additive having significant gas recombination capabilities to suppress the presence of gaseous hydrogen and oxygen in an energy storage device. This invention has special applicability to sealed secondary battery systems such as alkaline nickel-cadmium and nickel-iron batteries.

BACKGROUND OF THE INVENTION

Conventional electrode materials used in energy storage devices such as secondary battery systems include metal and metal oxide materials that have inherent limitations preventing their energy storage capacities from approaching their theoretical limits. The theoretical energy storage capacities of electrodes are further decreased by the need to add necessary amounts of binders, conductive particles and current collector structures. Electrodes are also limited due to the electrode material's inability to fully charge and discharge. Most conventional energy storage materials store electrical charges via chemical oxidation/reduction reactions on the surfaces of small particles. Often, the material located within the cores of these particles do not contribute to the energy density, thus the useable energy density of the material is much lower than that which is theoretically possible. As examples, the theoretical charge density of a pressed powder cadmium electrode is 477 mA-hr/g, but the practically achieveable discharge density is on the order of about 118 mA-hr/g; the theoretical charge density of an iron electrode is 960 mA-hr/g, but the actual discharge density of a commercial iron electrode is about 150 mA -hr/g; and the theoretical charge density of a zinc electrode is about 800 mA-hr/g, although the discharge density of such an electrode is generally about 160 mA-hr/g.

Conventional sealed energy storage systems are, by design, further self-limiting to avoid hazards such as hydrogen evolution. By way of example, a sealed nickel-cadmium cell incorporates an ampere-hour capacity of cadmium hydroxide that is about seventy to eighty percent greater than the ampere-hour capacity of the nickel hydroxide positive electrode. Upon charging this particular sealed cell, nickel hydroxide eventually becomes fully converted to a higher oxide of nickel if the charging current is continued after completed conversion of the nickel hydroxide, oxygen evolution commences and the system is said to be in an overcharge mode. Simultaneously during the charging process, as nickel hydroxide is being converted to a higher oxide of nickel at the positive electrode, cadmium hydroxide is being reduced to cadmium at the negative electrode. If all the cadmium hydroxide were reduced to cadmium metal, hydrogen evolution would commence immediately after reduction to the metal was completed and would continue to be evolved as long as the charging current persisted. The evolved hydrogen could eventually rupture the sealed cell. However, completed reduction of the cadmium hydroxide to cadmium metal is prevented because oxygen evolved at the positive electrode in the overcharge mode reacts with the excess cadmium metal in the negative electrode. Thus, an equilibrium is established whereby oxygen produced at the positive electrode on overcharge is consumed at the negative electrode, thereby preventing hydrogen evolution at this electrode. In this particular conventional sealed cell system, as well as many similar systems operating on the so-called oxygen cycle, hydrogen must not be allowed to be evolved, since there is no simple mechanism to oxidize hydrogen once formed in the cell. Thus, an important limitation of conventional nickel-cadmium cells is the need to have a large ampere-hour excess of cadmium hydroxide with respect to nickel hydroxide as a safety factor to insure that hydrogen is not formed in the cell. The energy density of the total cell is therefore diminished considerably since this large excess of cadmium hydroxide cannot be fully charged to realize its full capacity. This situation is described as a positive limited cell in the charge mode. For these reasons, energy storage devices using conventional electrochemical storage electrodes have charge storage densities that are substantially lower than their theoretical values.

Hydrogen-evolution during the discharge of alkaline electrolytic storage cells, especially cells connected in series was addressed by G. Neumann in U.S. Pat. No. 2,934,580 entitled "Electrolytic Cell, Particularly Accumulator Cell". Neumann recognized that an undesirable polarity reversal may occur in cells that become fully discharged, at which time hydrogen is irreversibly evolved. In accordance with the teaching of this reference, there is disposed between electrodes of opposing polarities an intermediate layer impregnated with electrolyte and containing at least one metallic compound having a relatively low conductivity. Such metal compounds are the oxides and hydroxides of the metals that form the active mass of an electrode; in the case of cadmium electrodes, cadmium oxide and cadmium hydroxide. When the polarity of the electrode in the cell becomes reversed, the metallic compound is reduced to the elemental metal instead of producing $H_2$ and becomes electrically conductive. Newman also prefers each cell to contain a negative electrode having a greater amount of active material than that of the positive electrode so that the negative electrode remains still charged when the positive electrode is fully discharged. It has been found that such arrangements are not effective at high discharge rates and often cause internal shorting of the cell.

Others have approached this problem by dealing with hydrogen once it is formed, rather than attempting to prevent its evolution. U.S. Pat. No. 3,117,033 to F. Bachmann entitled "Sealed Alkaline Storage Battery with Hydrogen Absorbing Electrode" describes a hydrogen-absorbing electrode arrangement utilizing an auxiliary electrode which contains silver or a silver compound in electrical connection with a positive electrode. Bachmann recognizes that a first concern with this auxiliary electrode is that silver oxide may be soluble in the electrolyte and migrate to the negative electrode causing short circuiting of the cell. This concern is best solved by Bachmann by disposing the auxiliary electrode in electrical contact with the positive electrode and on the opposite side of the positive electrode that faces the negative electrode.

This solution is useful for limited irreversible adsorption of hydrogen to partially decrease the gas pressure accumulated within a sealed cell.

Free oxygen is also generated to some extent in most energy storage systems utilizing conventional electrochemical storage materials. The design of energy storage devices must account for oxygen generated in the device and present as gaseous oxygen or as oxygen dissolved in the electrolyte.

In rechargeable alkaline batteries, when the charge step approaches completion, evolution of oxygen normally occurs as a result of the parallel half-cell reaction, $$2OH^- \rightarrow H_2O + 1/2O_2 + 2e^-$$

As the positive electrode becomes fully charged, the above reaction becomes responsible for a considerable production of oxygen gas. Simultaneous evolution of hydrogen gas at the negative electrode may be avoided by an overdesign in the capacity of the negative electrode. This leaves the production of oxygen in the latter stages of charge and overcharge as a major problem since such production consumes hydroxyl ions thereby upsetting the electrolyte composition, including pH, and the electrochemical behavior of the battery cell or cells.

Some recombination of oxygen to form hydroxyl ion and a reduction in the amount of free oxygen present, may occur at the negative electrode during the aforementioned charge and overcharge portion of the cell cycle. The overall reaction for such recombination, for example with a bivalent negative electrode, may be written as follows:

$$O_2 + 2H_2O + 2A \rightarrow 2A(OH)_2$$

where A may be a material such as cadmium, zinc or the like. The rate at which this recombination occurs, however, generally is insufficient to overcome the problem of oxygen generation particularly where a high rate of charging is involved in the use of the batteries.

Another problem which accompanies that of oxygen evolution is loss of some electrolyte through entrainment with the evolving gas. This may result in the additional deleterious effect of drying up the cell. Sealing of such an unbalanced cell is obviously dangerous since it could lead to early failure by bursting. Thus, in applications which call for a sealed cell, such a system may not be employed.

Recently, new classes of materials have been identified as having the ability to reversibly store energy through a hydrogen storage mechanism. Some of these materials are amorphous metal alloys. A general discussion of hydrogen adsorption by amorphous, or glassy, metal alloys was provided by G. G. Libowitz and A. J. Maeland, "Interactions of Hydrogen with Metallic Glass Alloys", Journal of the Less-Common Metals, 101, pp. 131-143, 1984.

Of the hydrogen storage amorphous metal alloys, copending patent applications USSN 717,429 and 717,428 to Tenhover et al. and Harris et al., now abandoned respectively, describe compositions and structures having outstanding hydrogen storage properties including the ability to be repeatedly fully charged and discharged. The measured charge densities of amorphous metal electrodes described in these patent applications range from about 200 mA-hr/g to about 444 mA-hr/g. These materials are active absorbers of hydrogen, and so hydrogen gas evolution in an energy storage system utilizing such materials is not a major concern. These materials have the ability to recombine oxygen, and so remove oxygen evolution as a major operating concern in a sealed system. Also, amorphous, or glassy, metal alloys do not exhibit phase changes such as dendritic growth over time, and so are more stable than some conventional electrode materials.

Others have suggested anodes for sealed secondary batteries that consist solely of a hydrogen-adsorbing material as the energy storing portion of the anode. U.S. Pat. No. 4,551,400 to Sapru et al. entitled "Hydrogen Storage Materials and Method of Sizing and Preparing the Same For Electrochemical Applications" describes a hydrogen storage material suitable for use as an anode which is a single or multiphase Ni-Ti-V alloy additionally containing Al, Zr or Cr. Furukawa et al. disclose a hydrogen adsorbing anode containing $CaNi_{5-x}Al_x$ and/or $CaNi_{5-x}Mn_x$ in Japanese patent application 84/29,194. Kawano et al. teach a multicomponent anode consisting of a hydrogen absorbing alloy powder such as $LaNi_5$, a powder catalyst for oxygen ionization, a fluororesin powder and an alkali-resistant resin powder in Japanese patent application 84/30,806.

While these materials may have actual charge storage capacities that are superior to conventional electrochemical energy storage materials and do not suffer from concerns inherent with more conventional electrode materials, their costs are higher.

Thus it is seen that the potential exists to optimize materials for energy storage in terms of efficiency and cost. What is needed in this field are economical cell designs having high energy storage densities and the ability to cope with hydrogen and oxygen generation.

It is therefore one object of the present invention to provide an electrode additive for electrochemical storage having the ability to absorb hydrogen and recombine oxygen.

This and other objects of the present invention will become obvious to one skilled in the art from the following description of the invention and the appended claims.

SUMMARY OF THE INVENTION

The present invention relates to an additive for energy storage devices comprising at least one negative electrode and at least one positive electrode being separated by at least one separator, the additive being a material capable of absorbing hydrogen and recombining oxygen that is a substantially amorphous alloy of the formula:

$$A_a M_b M'_c$$

wherein A is at least one element selected from the group consisting of Ag, Au, Hg, Pd and Pt;

M is at least one metal selected from the group consisting of Ni, Co, Fe, Mn, Cu, Cr, Cd, Zn, Be and Al;

M' is at least one element selected from the group consisting of Ca, Mg, Ti, Zr, Hf, V, Nb, Ta, La, Y, the rare earths, Sr, Ba, Li, Na, K, Rb, Cs, Th, U, Pu and Sc; and wherein a ranges from greater than zero to about 0.95;

b ranges from greater than zero to about 0.95; and c ranges from about 0.05 to about 0.88; with the proviso that (a+b+c) equals about 1.00.

The present invention also relates to an energy storage device comprising a housing having at least one negative electrode and at least one positive electrode, the electrodes of opposite polarity being electrically insulated from each other by means of at least one separator disposed therebetween, an electrolyte in contact with the electrodes and the at least one separator, means for collecting electrical current therefrom and also having therein an additive in accordance with the present invention.

The additive described herein may be disposed as a coating on the negative electrode in an energy storage device, as an auxiliary electrode, or as one negative electrode in a series.

DETAILED DESCRIPTION OF THE INVENTION

In accordance with the present invention there are disclosed novel additives for energy storage devices that are amorphous metal alloys capable of reversibly storing hydrogen and facilitating the recombination of oxygen.

These amorphous hydrogen storage materials are the substantially amorphous metal alloys represented by the formula:

$$A_a M_b M'_c$$

wherein
- A is at least one element selected from the group consisting of Ag, Au, Hg, Pd and Pt;
- M is at least one metal selected from the group consisting of Ni, Co, Fe, Mn, Cu, Cd, Zn, Be and Al;
- M' is at least one element selected from the group consisting of Ca, Mg, Ti, Zr, Hf, V, Nb, Ta, La, Y, the rare earths, Sr, Ba, Li, Na, K, Rb, Cs, Th, U, Pu and Sc, and;

wherein
- a ranges from greater than zero to about 0.95;
- b ranges from greater than zero to about 0.95; and
- c ranges from about 0.05 to about 0.88; with the proviso that (a+b+c) equals about 1.00.

Preferably a ranges from greater than zero to about 0.20, b ranges from about 0.30 to about 0.90, and c ranges from about 0.10 to about 0.70.

To ease the formation of the amorphous phase, and/or to impart increased corrosion resistance, a fourth component, $X_d$, may be incorporated into the formula above; wherein X is at least one element selected from the group consisting of B, N, C, Ge, P, As, Sb, Pb, Ru, Cr, Mo, Si, W, Sn and Ga; and wherein d ranges from zero to about 0.25. When $X_d$ is present, then (a+b+c+d) equals about 1.00.

The term "substantially" as used herein in reference to the amorphous metal alloys indicates that the metal alloys are at least fifty percent amorphous, as indicated by X-ray diffraction analysis. Preferably, the metal alloy is at least eighty percent amorphous and most preferably about one hundred percent amorphous, as indicated by X-ray diffraction analysis. The use of the phrase "amorphous metal alloy" herein refers to amorphous metal-containing alloys that may also comprise non-metallic elements.

If only hydrogen absorption is considered, then preferably A is Pt, Pd, Hg or combinations thereof; M is nickel, iron, manganese or a combination thereof; and M, is titanium, magnesium, zirconium, tantalum or a combination thereof. By combination is meant mixtures and/or alloys of the above-listed elements. As is more fully described in USSN 717,428, entitled "Improved Amorphous Metal Alloy Compositions for Reversible Hydrogen Storage", the A component of such an amorphous metal alloy may be selectively placed so that the A component is disposed substantially on the surface of the amorphous metal alloy composition. The phrase "on the surface" embodies any location in the alloy structure wherein the A component may actively absorb and/or desorb hydrogen into and out of the alloy. The A component is not disposed on the surface as a separate layer, but rather is an integral part of the amorphous metal alloy having a concentration on the surface of the alloy. By concentrating the A component on the surface of the amorphous metal alloy composition, the A component is most effectively utilized for hydrogen storage. Since the A component is preferably Pt, Pd or Hg, its efficient utilization permits smaller quantities of this material to be used without sacrificing energy storage capacity.

The amorphous metal alloy compositions taught herein have the ability to reversibly store up to more than 1.1 hydrogen atoms per molecule of alloy. This compares favorably to known hydrogen storage materials such as crystalline palladium that stores about 0.55 hydrogen atoms per atom of palladium. Since the hydrogen storage materials represented by the above empirical formula are substantially amorphous, these compositions are stable and not as subject to phase separation and hydrogen embrittlement as crystalline and polycrystalline materials. Additionally, these compositions can be cycled in oxidative atmospheres with no appreciable surface passivation. These amorphous compositions also demonstrate resistance to corrosive environments, such as those encountered in secondary battery systems.

The presence of other elements as impurities in these amorphous metal alloy hydrogen storage materials is not expected to seriously impair the ability of the material to reversibly store hydrogen. To ensure the desired hydrogen storage properties of these amorphous metal alloy materials, it is not intended that these materials be utilized in applications wherein the temperature of the alloy may reach or exceed its crystallization temperature.

With respect to synthesizing amorphous metal alloys, physical and chemical methods such as electron beam deposition, ion implantation, chemical reduction, thermal decomposition, ion cluster deposition, ion plating, liquid quenching, gas atomization, solid state diffusion, RF and DC sputtering may be utilized to form such compositions. One or more methods may be combined advantageously to produce amorphous metal alloy particles.

The use of amorphous reversible hydrogen storage materials taught herein as additives for conventional electrochemical negative electrodes yield the following improvements to energy storage devices in which they are incorporated: elimination of antipolar mass typically incorporated into the positive electrode to recombine with hydrogen generated during overdischarge conditions and replacement of it with additional active positive electrode material for increased energy storage capacity; means for oxygen recombination of oxygen formed during overcharging conditions, which results in decreased charge time since oxygen evolution is no longer a charge-limiting variable; enhanced energy storage capacity due to the amorphous material's ability to store hydrogen reversibly therein; absorption of hydrogen generated during charge in the negative electrode thereby reducing cell pressure; and permitting a closer ratio of charged electrode species between the positive and negative electrodes for an overall increase in the cell discharge capacity that can be achieved.

This material additive may be incorporated into a cell design in several manners; as a coating on a negative electrode, as a thin layer disposed between two cell separators or within a single separator, as an auxiliary electrode, and as one negative electrode in a cell having a plurality of negative and positive electrodes in series or parallel connections.

In one embodiment of the invention, the additive is provided as a full or partial coating on a negative electrode that comprises an electrochemical charge storage material. The electrochemical charge storage material that comprises the negative electrode preferably contains a transition metal or a Group II-A metal of the Periodic Table of Elements. The metal may be present in its elemental form, or may exist in one or more oxidation states. Examples of such electrochemical storage materials include cadmium, iron, zinc, mercury, lead, carbon, copper and cobalt. These elements may be present and utilized in the oxide form, preferably as a hydroxide such as cadmium hydroxide.

Such materials are known to be electrochemical charge storage materials and to contain inherent shortcomings which effectively inhibit these materials from approaching their theoretical energy storage capacity when discharged, as has been discussed above. As is now disclosed, these electrochemical storage materials are combined with an additive coating of an amorphous reversible hydrogen storage material to form a coated electrode that suppresses oxygen and hydrogen accumulation.

The coating need not completely coat the electrode, but is preferably disposed on the electrode surface nearest the positive electrode. In this way oxygen evolved at the positive electrode due to overcharge and hydrogen evolved at the positive electrode due to deep discharge are rapidly recombined and absorbed, respectively. The amorphous metal alloy can be chosen so that the environment in the energy storage device especially at the interface of the negative electrode does not affect the alloy's stability.

The amount of amorphous metal alloy disposed on the electrode as a coating may be as much as thirty weight percent, based on the total weight of the electrode. Preferably, the amount of hydrogen storage material disposed on the electrode is from about twenty-five weight percent to about ten weight percent, based on the total weight of the electrode. The amorphous hydrogen storage material will also contribute to the overall charge storage ability of the negative electrode, as discussed in detail in copending patent application USSN 858315, now abandoned entitled "Hybrid Electrodes and Energy Storage Devices Incorporating Such Electrodes Therein", which disclosure is incorporated herein by reference.

Such an additive coated electrode is used in an energy storage device which comprises a housing containing a negative electrode as described hereinabove, a positive electrode electrically insulated from the negative electrode and an electrolyte in contact with the negative and positive electrodes. A separator is disposed between the two electrodes and means are additionally provided for collecting current from the device.

The positive, or counter, electrode in an energy storage device incorporating a negative, coated electrode as taught herein, may be any of the well-known positive electrodes now used in conjunction with conventional negative electrochemical charge storage materials. Such positive electrodes include nickel hydroxide, silver hydroxide, manganese dioxide, mercury oxide, lead oxide, carbon and the like. The electrolyte is chosen with respect to the electrode systems in which it Will be incorporated. Hydrogen storage amorphous metal alloys are available that are stable in alkaline and acid environments. The stability of the counter electrode and the electrochemical charge storage material in the hybrid electrode will generally be more environment-limited than the hydrogen storage material. The electrolyte in an energy storage device may be an alkaline solution such as potassium hydroxide and sodium hydroxide solutions, or may be an acid solution such as $H_2SO_4$, $HCl$, $HNO_3$, $H_3PO_4$, acetic acid and the like.

Suitable housing, separator and current collection means for the energy storage device utilizing a coated electrode as taught herein are available from the present state of the art components and one skilled in the art can readily optimize such components for the particular electrode and electrolyte systems chosen. The use of an additive-coated electrode which can absorb hydrogen and recombine oxygen relaxes the constraints imposed on the housing, whether it be vented or sealed to the external environment.

From the above description of the invention it becomes apparent that one embodiment of the invention contemplates rechargeable battery devices utilizing an electrode comprising an electrochemical charge storage material having an additive as taught herein coated thereon. Examples of such rechargeable battery systems include systems that initially comprise nickel hydroxide/coated cadmium oxide batteries; nickel hydroxide/coated iron oxide batteries; nickel hydroxide/coated cadmium oxide-iron oxide batteries; nickel hydroxide/coated zinc oxide batteries; manganese dioxide/coated zinc oxide batteries; silver oxide/coated cadmium oxide batteries; silver oxide/coated zinc batteries; and lead oxide/coated lead sulfate batteries. It is also within the scope of the present invention to include the use of the additives taught herein in novel rechargeable battery systems based on charged metal electrodes such as sponge nickel/additive-coated sponge cadmium batteries and sponge nickel/additive-coated sponge iron batteries.

Another embodiment of the present invention is the use of a coated electrode in an electric double layer capacitor system, such as that disclosed in U.S. Pat. No. 3,536,963 to Boos. The mechanism for energy storage in such a device is the formation of an electrical double layer at the interface between an activated carbon electrode and a supporting electrolyte under an applied electric field. These devices will accept and store significant amounts of energy at any available potential over which the device is stable, unlike batteries where a given threshold voltage must be exceeded. Optimization of this system is based on the optimization of the charge storage capacity of the activated carbon electrode used therein. It has been found that the capacity of such an electric double-layer capacitor can amount to several tens of farads per gram of activated carbon when the activated carbon has a surface area in excess of 1000 $m^2/g$. The charge storage capacity and gas recombination characteristics of such a device is further increased by incorporating a hydrogen storage amorphous metal alloy as an additive coating on one of the activated carbon electrodes, as taught herein.

BRIEF DESCRIPTION OF THE DRAWINGS

The novel additive which is taught in this disclosure may be incorporated into an energy storage device in various manners, as is best understood from the following description of specific embodiments when read in conjunction with the accompanying drawings in which:

FIG. 3 is a cross sectional view of a storage battery having a plurality of negative and positive electrodes connected in parallel, wherein the cell additive as taught herein is substituted for one of the negative electrodes.

DETAILED DESCRIPTION OF THE DRAWINGS

Figure 1:
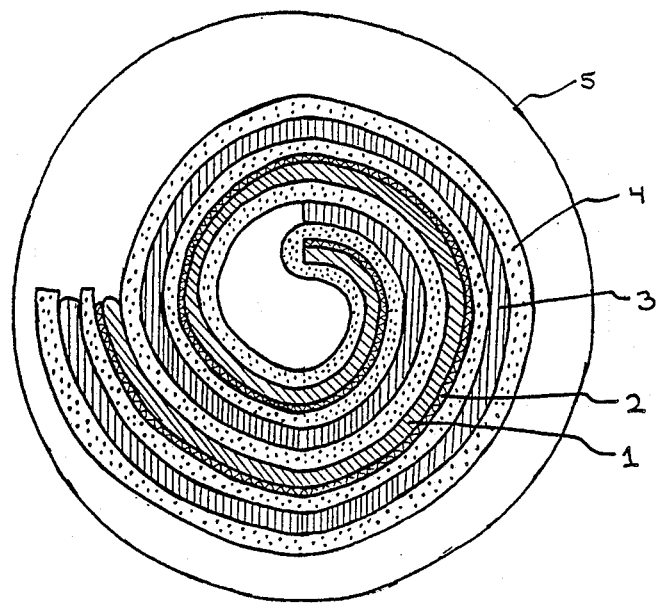
FIG. 1 is a sectional view of a rechargeable storage battery including a negative jelly-rolled electrode having an additive coating thereon in accordance with the present invention.

Referring now to FIG. 1, there is shown the present invention embodied in a jelly-rolled configuration. The negative electrode 1 such as cadmium oxide has an additive coating 2 on one side. The coated negative electrode 1, separator 4 and positive electrode 3 are shaped in the form of a spiral configuration housed within circular container 5. The separator entrains an electrolyte such as an aqueous solution of alkaline metal hydroxide. In this type of configuration, the positive and negative electrode terminals may be insulated from the housing 5 and electrically connected to their corresponding electrode tabs in a manner well known in the art, but not shown on the drawing or described herein. In this Figure, the additive coating is provided as a layer 2 applied along the inner spiral of negative electrode 1. The additive layer 2 may be made relatively thin and porous so that its presence does not hinder the electrochemical storage properties of the positive and negative electrodes. The additive provides means for recombination of oxygen formed at the positive electrode during overcharge conditions, and of hydrogen which may be formed at the positive electrode during deep discharge. The coating also provides for the absorption of hydrogen generated in the negative electrode during charging. In these ways, the additive maintains a relatively low pressure within the cell. The additive can also be formulated within the designated compositions of $A_aM_bM'_c$ and $A_aM_bM'_cX_d$ to remain substantially insensitive to the specific environment in which it is intended to be used. Thus, the alkaline environment induced by an aqueous alkaline metal hydroxide electrolyte will not affect the performance of the additive.

Figure 2:
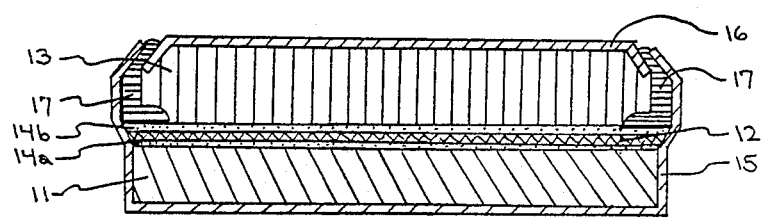
FIG. 2 is a cross sectional view of a miniature button cell containing a thin layer of an additive as taught herein disposed within the separator layer of the cell.

FIG. 2 depicts the additive as a thin film disposed within a separator in a miniature button cell. In this cross sectional drawing, a container 15 holds negative electrode material 11 therein. The container may be of any suitable metallic material such as nickel or silver plated alloys and may be the electrical contact for the negative electrode material 11 therein. In view of the additive's ability to suppress pressure generated within a sealed cell due to the presence of hydrogen and/or oxygen, the container 15 may also comprise a nonmetallic material such as a plastic material. The negative electrode material may be any one of those materials recited hereinabove as suitable negative electrodes and those others obvious to one skilled in the art. Disposed contiguously over the negative electrode are separator layers 14a and 14b having a thin layer of additive 12 disposed therebetween and in contact with container 15, which in this Figure is the electrical contact for the negative electrode 11. The separator layers are impregnated with electrolyte. In the embodiment shown herein, the additive layer comprises finely distributed amorphous metal alloy particles sandwiched between two thin separator layers whose total thickness is about equal to that of a single separator layer that would typically be used in such a cell. Immediately above the separator layer 14b is positive electrode material 13 and annular gasket means 17. The gasket means 17 maintains the separator layer in position, electrically insulates the positive electrode 13 from the container 15, and provides a compression fit between the container 15 and a cell cover 16.

As in FIG. 1, the additive is disposed between the negative and positive electrodes and subjected to the environment created by the cell electrolyte. The additive maintains a relatively low pressure within the cell by recombining oxygen generated at the positive electrode and by reversibly absorbing hydrogen that may be evolved at either the negative or positive electrodes.

Referring now to FIG. 3, there is shown an accumulator or battery casing 25 which can be hermetically closed so as to be gas and liquid tight. The casing 25 encloses several positive electrodes 23 and negative electrodes 21 in alternating sequence. In this Figure, the centrally disposed electrode 22 which would otherwise comprise a negative electrode has been substituted therewith for an electrode comprising the additive in accordance with the present invention. Separators 24 are arranged between each positive and negative electrode and have immobilized therein an electrolyte such as an aqueous solution of alkaline metal hydroxide. Electrode tabs 27 extend from each positive electrode 23 to the positive terminal 28 of the cell, and negative electrode tabs 29 provide current pathways from each negative electrode 21 and the additive-substituted negative electrode 22 to the negative terminal 30 of the cell. The electrode assembly is insulated from the container 25 by means of an electrically insulating material 26 which is disposed around the side walls and base of the container 25. The effect of using an amorphous metal additive electrode 22 in place of a negative electrode is to maintain a reduced pressure within the sealed battery casing.

It is to be understood that each of the above embodiments in which the additive has been disposed may also find useful applications in other types of batteries differing from the types described above and may be utilized in other forms.

The amorphous metal additives taught herein provide sealed cells having the ability to recombine oxygen, reversibly store hydrogen and maintain high energy storage capacity, and so represent a substantial advancement to energy storage, energy storage devices and its anciliary technologies and applications.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

We claim:

1. An additive for energy storage devices comprising at least one negative electrode and at least one positive electrode separated by at least one separator, said additive being a material capable of absorbing hydrogen and recombining oxygen that is a substantially amorphous alloy of the formula:

$A_a M_b M'_c$ wherein
A is at lest one element selected from the group consisting of AG, Au, Hg, and Pt;
M is at least one metal selected from the group consisting of Ni, Co, Fe, Mn, Cu, Cr, Cd, Zn, Be and Al;
M' is at least one element selected from the group consisting of Ca, Mg, Ti, Zr, Hf, V, Nb, Ta, La, Y, the rare earths, Sr, Ba, Li, Na, K, Rb, Cs, Th, U, Pu and Sc; and wherein
a ranges from greater than zero to about 0.95;
b ranges from greater than zero to about 0.95; and
c ranges from about 0.05 to about 0.88; with the proviso that (a+b+c) equals about 1.00.

2. The additive in accordance with claim 1 wherein
A is at least one of Pt and Hg;
M is at least one of Ni, Fe, Mn; and
M' is at least one of Ti, Mg, Zr and Ta.

3. The additive in accordance with claim 1 wherein
a ranges from greater than zero to about 0.20;
b ranges from about 0.30 to about 0.90; and
c ranges from about 0.10 to about 0.70.

4. The additive in accordance with claim 1 wherein thee is additionally present $X_d$
wherein
X is at least one element selected from the group consisting of B, N, C, Ge, P, As, Sb, Pb, Ru, Cr, Mo, Si, W, Sn and Ga; and
wherein d ranges from zero to about 0.25; and
wherein (a+b+c) equals about 1.00.

5. An energy storage device comprising a housing containing at least one negative electrode and at least one positive electrode, the electrodes of opposite polarities being electrically insulated from each other by means of at least one separator disposed therebetween, an electrolyte in contact with the electrodes and means for collecting electrical current therefrom, and an additive in said device capable of absorbing hydrogen and recombining oxygen that is a substantially amorphous alloy of the formula:

$A_a M_b M'_c$ wherein
A is at least one element selected from the group consisting of Ag, Au, Hg and Pt;
M is at least one metal selected from the group consisting of Ni, Co, Fe, Mn, Cu, Cr, Dc, Zn, Be and Al;
M' is at least one element selected from the group consisting of Ca, Mg, Ti, Zr, Hf, V, Nb, Ta, La, Y, the rare earths, Sr, Ba, Li, Na, K, Rb, Cs, Th, U, Pu and Sc; and
wherein
a ranges from greater than zero to about 0.95;
b ranges from greater than zero to about 0.95; and
c ranges from about 0.05 to about 0.88; with the proviso that (a+b+c) equals about 1.00.

6. The energy storage device in accordance with claim 5 wherein at least one negative electrode comprises an electrochemical charge storage material which contains a transition metal or a Group IIA metal from the Periodic Table of Elements.

7. The energy storage device in accordance with claim 6 wherein said electrochemical charge storage material contains at least one element selected from the group consisting of Cd, Fe, Zn, Hg, Pb, C, Cu and Co.

8. The energy storage device in accordance with claim 5 wherein said substantially amorphous alloy additionally comprises component $X_d$
wherein
X is at least one element selected from the group consisting of B, N, C, Ge, P, As, Sb, Pb, Ru, Cr, Mo, Si, W, Sn and Ga; and
wherein d ranges from zero to about 0.25; and
wherein (a+b+c) equals about 1.00.

9. The energy storage device in accordance with claim 5 wherein said additive is a coating on said at least one negative electrode.

10. The energy storage device in accordance with claim 9 wherein said coating coats part of said at least one negative electrode.

11. The energy storage device in accordance with claim 9 wherein said coating comprises up to 30 weight percent of said coated negative electrode, based on the total weight of the coated negative electrode.

12. The energy storage device in accordance with claim 9 wherein said coating comprises from about 10 weight percent to about 25 weight percent of said coated negative electrode based on the total weight of said coated negative electrode.

13. The energy storage device in accordance with claim 9 wherein said coating is disposed on said at least one negative electrode proximate said at least one positive electrode.

14. The energy storage device in accordance with claim 5 including two separators wherein said additive is disposed between said two separators.

15. The energy storage device in accordance with claim 5 wherein said additive comprises an auxiliary electrode disposed in said electrolyte.

16. The energy storage device in accordance with claim 5 including a plurality of negative and positive electrodes and wherein said additive comprises at least one of said negative electrodes.

* * * * *